3,128,263
N-HALOBENZOGUANAMINE VULCANIZING
AGENTS FOR SATURATED ELASTOMERS
Peter E. Wei and John Rehner, Jr., Westfield, N.J., assignors to Esso Research and Engineering Company, a corporation of Delaware
No Drawing. Filed Mar. 5, 1962, Ser. No. 177,177
12 Claims. (Cl. 260—41)

This invention relates to saturated elastomeric compositions of matter which are made curable by the addition of an N-halobenzoguanamine.

It has heretofore been known to vulcanize high unsaturation elastomers, such as natural rubber, with sulfur and certain mild accelerators, such as derivatives of guanidine and thiazole. Low unsaturation elastomers, such as butyl rubber, have been vulcanized with somewhat greater difficulty by the use of sulfur, zinc oxide, and accelerators, such as dithiocarbamates and thiuram derivatives. However, these curing agents are ineffective as vulcanizers for elastomers of no unsaturation at all. By this invention it has surprisingly been found that fully saturated elastomers may be cured with the use of an N-halobenzoguaramine in combination with sulfur and/or zinc oxide.

More specifically, to 100 parts of elastomer is added between about 0 to 10 parts by weight of sulfur and/or zinc oxide, preferably 0.5 to 5 parts, and 1 to 20 parts by weight of an N-halobenzoguaramine, preferably 2 to 10 parts. The resulting mixture is then heated to yield a vulcanizate. To further improve the process, various fillers, such as carbon black, clays, and silicates, and metallic compounds, such as ferric oxide, $FeCl_3$, ferric carboxylates, cadmium oxide, magnesium oxide, or aluminum oxide may be added to the mixture.

The elastomers to which this invention is applicable are those rubbery compositions which are fully saturated (i.e. contain no ethylenic unsaturation). Preferred among these are substantially amorphous polymers and copolymers prepared by the "low pressure" process. This process is generally described in the literature, e.g. see Scientific American, September 1957, page 98 et seq., and Belgian Patent 538,782. These rubbery polymers include $C_2$—$C_5$ alpha olefin homopolymers, such as polyethylene and polypropylene, as well as the more preferred copolymers of ethylene and $C_3$—$C_5$ alpha olefins. Most preferred is the copolymer of ethylene and propylene.

The invention is also applicable to blends of these elastomers with other rubbers such as natural rubber, butyl rubber, polyisobutylene and butadiene-styrene.

For the purpose of convenience, details of the "low pressure" polymerization process are here presented, although it should be realized that these by themselves constitute no part of the invention. In that process alpha olefin monomers are polymerized with the aid of catalysts which are obtained by complexing a heavy metal compound, such as vanadium or titanium tetrahalide with an aluminum alkyl compound, such as aluminum triethyl, aluminum triisobutyl, aluminum diethyl chloride, etc.

The polymerization is effected in the presence of inert hydrocarbon solvents at temperatures of about 0°–100° C. and pressures which usually range between 0 and 100 p.s.i.g. When the desired degree of polymerization has been reached, a $C_1$—$C_8$ alcohol is added to the reaction mixture for the purpose of dissolving and deactivating the catalyst and for precipitating the polymer product from solution. The solid polymer may then be separated by filtration, washed, dried and compacted.

The N-halobenzoguanamine compounds which may be used in this invention are represented by the structure below:

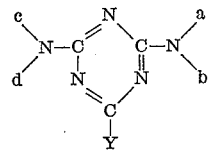

where at least one of a, b, c, d is chlorine, bromine, or iodine and the others are hydrogen, and Y is a phenyl group. The preferred compound is chlorinated 2,4-diamino-6-phenyl-symtriazine containing four Cl atoms per molecule (tetrachlorobenzoguanamine). This material was prepared by direct chlorination of benzoguanamine according to the procedure published in February 1960 by the Rohm and Haas Company, in a pamphlet entitled "Benzoguanamine."

The vulcanization is effected by thoroughly contacting the elastomer with the curing mixture, e.g., on a rubber mill, or in a Banbury mixer, and subjecting the resulting mixture to temperatures of 250 to 450° F., preferably 260 to 350° F. for from 1 to 120 minutes, preferably 10 to 60 minutes. Alternatively, the mixture components may be mixed in a masterbatch and then heated to vulcanizing temperatures. This alternative has the advantage of decreasing mixing time and improving the processability of the uncured elastomer.

This invention and its advantages will be better understood by reference to the following examples.

EXAMPLE I

An elastomeric ethylene-propylene copolymer was cured with the use of chlorinated benzoguaramine with the results as given below. The ethylene-propylene copolymer was produced by the continuous copolymerization of a mixture of ethylene and propylene in a pilot plant reactor. The feed gas contained 57% of propylene and 43% of ethylene, by weight. The polymerization was carried out at 181° F. in hexane as the reaction medium, at a reactor pressure of 60 p.s.i.g., in the presence of a Ziegler-type catalyst consisting of a complex of $VCl_3$ and $Al(C_6H_{13})_3$. The mole ratio of $Al(C_6H_{13})_3$ to $VCl_3$ in the catalyst was 2.11, and the catalyst was fed continuously to the reactor to maintain a catalyst concentration of 0.0297 pound per 100 pounds of hexane. The feed gas and catalyst feed rate were balanced so as to provide a finished copolymer containing 62 mole percent of ethylene units. The product had an intrinsic viscosity of 5.12, as measured in dilute decalin at 135° C., a Mooney plasticity value of 93 (measured in 8 minutes at 212° F), and it contained 22.5% by weight of toluene-insoluble material. The stream from the reactor was quenched with isopropyl alcohol to stop the reaction and precipitate the product, and the latter was degassed and dried in a commercial extruder.

*Chlorinated Benzoguanamine as Vulcanizing Agent for Gum Ethylene-Propylene Elastomer*

|  | A | B | C | D |
|---|---|---|---|---|
| Elastomer | 100 | 100 | 100 | 100 |
| Sulfur | 1 | 1 | 0 | 1 |
| Zinc Oxide | 2 | 0 | 2 | 2 |
| Chlorinated Benzoguanamine a | 0 | 10 | 10 | 10 |
| Cured at 280° F. for 30 minutes: |  |  |  |  |
| Tensile strength, p.s.i | 120 | 250 | 1,610 | 1,650 |
| Elongation, percent | 550 | 800 | 650 | 780 |
| Cured at 320° F. for 30 minutes: |  |  |  |  |
| Tensile strength, p.s.i | 130 | 250 | 1,360 | 1,520 |
| Elongation, percent | 450 | 900 | 600 | 750 |
| Cured at 335° F. for 60 minutes: |  |  |  |  |
| Tensile strength, p.s.i | 130 | 1,130 | 1,000 | 1,170 |
| Elongation, percent | 550 | 680 | 630 | 700 | a Chlorinated 2,4-diamino-6-phenyl-sym-triazine.

As can be seen from the above data, the elastomer could not be cured with sulfur and zinc oxide; however, satisfactory cures were obtained by using chlorinated benzoguanamine in combination with sulfur and/or zinc oxide as a curative. Best results were obtained with the use of the chlorinated benzoguanamine and both sulfur and zinc oxide.

EXAMPLE II

The same elastomer as in Example I was cured with the use of chlorinated benzoguanamine. In this example, the curing recipe additionally included carbon black. Details and results are given below.

*Chlorinated Benzoguanamine as Vulcanizing Agent for Filled Ethylene-Propylene Elastomer*

|  | E | F | G | H | I | J |
|---|---|---|---|---|---|---|
| Elastomer | 100 | 100 | 100 | 100 | 100 | 100 |
| HAF Carbon Black | 50 | 50 | 50 | 50 | 50 | 50 |
| Sulfur | 0 | 1 | 0 | 1 | 0 | 1 |
| Zinc Oxide | 0 | 2 | 0 | 0 | 2 | 2 |
| Chlorinated Benzoguanamine a | 0 | 0 | 10 | 10 | 10 | 10 |
| Cured at 280° F. for 30 minutes: |  |  |  |  |  |  |
| Tensile strength, p.s.i | 500 | 370 | 580 | 600 | 1,310 | 1,860 |
| Elongation, percent | 680 | 600 | 700 | 700 | 600 | 580 |
| Cured at 320° F. for 30 minutes: |  |  |  |  |  |  |
| Tensile strength, p.s.i | 670 | 450 | 420 | 740 | 1,100 | 1,250 |
| Elongation, percent | 700 | 630 | 700 | 600 | 550 | 700 |
| Cured at 335° F. for 60 minutes: |  |  |  |  |  |  |
| Tensile strength, p.s.i | 470 | 410 | 380 | 1,220 | 1,200 | 2,230 |
| Elongation, percent | 550 | 480 | 650 | 580 | 580 | 630 | a Chlorinated 2,4-diamino-6-phenyl-sym-triazine.

As may be seen from the above data, the elastomer was not cured with the use of chlorinated benzoguanamine alone (Run G) nor with the use of sulfur and zinc oxide (Run F). However, successful cures were obtained when the chlorinated benzoguanamine was used in conjunction with sulfur or zinc oxide, and the best cure was obtained with the use of all three components (Run J) with carbon black being additionally present.

The advantages of this invention will be apparent to those skilled in the art. Saturated elastomers are cured to provide products of high tensile strength having substantially no odor and with satisfactory physical characteristics.

This invention has been described in connection with certain specific embodiments thereof; however, it should be understood that these are by way of example, rather than by way of limitation, and it is not intended that the scope of the invention be restricted thereby.

What is claimed is:

1. A composition of matter comprising a saturated rubbery alpha-olefin polymer cured with an N-halobenzoguanamine wherein the halogen is selected from the class consisting of chlorine, bromine and iodine, and at least one compound selected from the class consisting of sulfur and zinc oxide.

2. A composition of matter comprising an elastomeric copolymer of ethylene and a $C_3$—$C_5$ alpha monoolefin cured with an N-halobenzoguanamine wherein the halogen is selected from the class consisting of chlorine, bromine and iodine, and at least one compound selected from the class consisting of sulfur and zinc oxide.

3. The composition of claim 2 wherein the N-halobenzoguanamine is chlorinated 2,4-diamino-6-phenyl-sym-triazine.

4. The composition of claim 3 which contains both sulfur and zinc oxide.

5. The composition of claim 4 which additionally contains 0 to 200 parts by weight of carbon black per 100 parts of elastomer.

6. A composition of matter comprising: (1) an elastomeric copolymer of ethylene and propylene cured with (2) a vulcanizing amount of chlorinated 2,4-diamino-6-phenyl-sym-triazine and (3) a vulcanizing amount of at least one compound selected from the class consisting of sulfur and zinc oxide.

7. A process for curing an elastomeric copolymer of ethylene and a $C_3$—$C_5$ higher alpha olefin which comprises heating the elastomeric copolymer to a temperature in the range of 250 to 450° F. in the presence of vulcanizing amounts of an N-halobenzoguanamine and at least one compound selected from the class consisting of sulfur and zinc oxide.

8. The process of claim 7 wherein 0 to 200 parts of carbon black is added prior to vulcanization.

9. A vulcanizable composition of matter comprising an elastomeric copolymer of ethylene and a $C_3$—$C_5$ higher alpha olefin mixed with 1 to 20 parts of N-halobenzoguanamine and 0 to 10 parts of at least one compound selected from the class consisting of sulfur and zinc oxide.

10. A vulcanizable composition of matter according to claim 9 which additionally contains 0 to 200 parts of carbon black per 100 parts of copolymer.

11. A sulfur curable composition of matter comprising an elastomeric copolymer of ethylene and a $C_3$—$C_5$ higher alpha olefin mixed with 1 to 20 parts of an N-halobenzoguanamine.

12. A vulcanizable composition of matter comprising a saturated rubbery alpha-olefin polymer mixed with 1 to 20 parts of an N-halobenzoguanamine and up to 10 parts of at least one compound selected from the class consisting of sulfur and zinc oxide.

References Cited in the file of this patent

UNITED STATES PATENTS

| 2,671,787 | Bortnick | Mar. 9, 1954 |
| 2,890,187 | Bowman et al. | June 9, 1959 |
| 2,953,563 | Schaefer et al. | Sept. 20, 1960 |
| 3,050,494 | Robbins et al. | Aug. 21, 1962 |